(12) United States Patent
Dahl et al.

(10) Patent No.: US 6,572,179 B2
(45) Date of Patent: Jun. 3, 2003

(54) SIDE PANEL ASSEMBLY FOR WHEELED WORK MACHINE

(75) Inventors: Jeffrey A. Dahl, Lincoln, ND (US); Dennis A. Fuller, Bismarck, ND (US)

(73) Assignee: Clark Equipment Company, Woodcliff Lake, NJ (US)

( * ) Notice: Subject to any disclaimer, the term of this patent is extended or adjusted under 35 U.S.C. 154(b) by 0 days.

(21) Appl. No.: 09/977,110

(22) Filed: Oct. 12, 2001

(65) Prior Publication Data

US 2003/0071487 A1 Apr. 17, 2003

(51) Int. Cl.[7] .............................................. B62D 25/02
(52) U.S. Cl. ............................. 296/190.08; 296/203.03
(58) Field of Search ..................... 296/190.01, 190.08, 296/193, 197, 203.03

(56) References Cited

U.S. PATENT DOCUMENTS 3,541,668 A * 11/1970 Wessells, III et al. .. 296/193 X
3,841,430 A * 10/1974 Babbitt, Jr. et al. ..... 296/102 X
6,209,949 B1 * 4/2001 Sakyo et al. ........ 296/203.03 X

FOREIGN PATENT DOCUMENTS

JP          402216374       *  8/1990  ............ 296/190.08

* cited by examiner

Primary Examiner—Dennis H. Pedder
(74) Attorney, Agent, or Firm—Westman, Champlin & Kelly, P.A.

(57) ABSTRACT

A wheeled work machine has a cab that is assembled with side panel assemblies that are each formed from two mating die formed side panel sections so that smoothly curved shapes, and recessed cross sections can be made. When the two panel sections are rigidly joined together, they form strong, bend and torsion resistant box sections for structural members around an operator access opening, as well as around an accessory opening. The inner one of the die formed panel sections includes flanges that extend inwardly toward the center portions of the cab for supporting cross panels such as seat supports, a roof, and a dash board assembly. The side panels and cross members are spot welded together to form a quickly made, smooth appearing, and very strong operator cab.

13 Claims, 7 Drawing Sheets

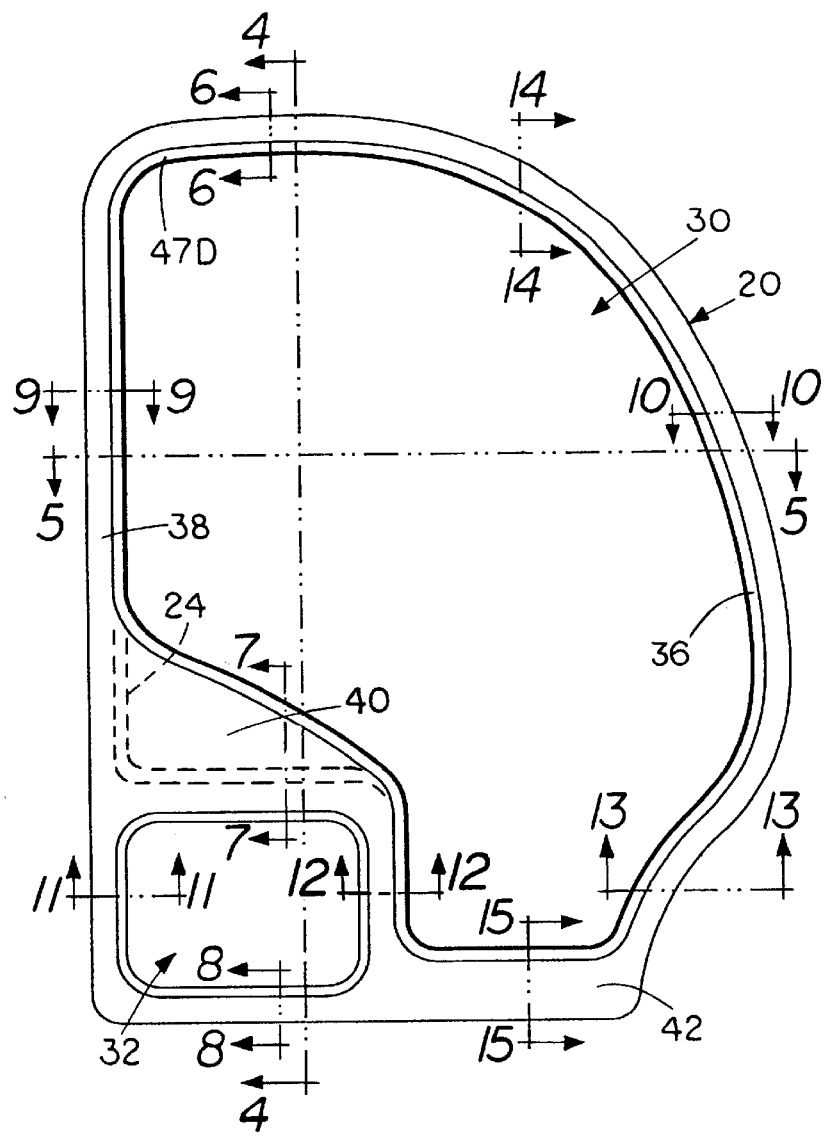
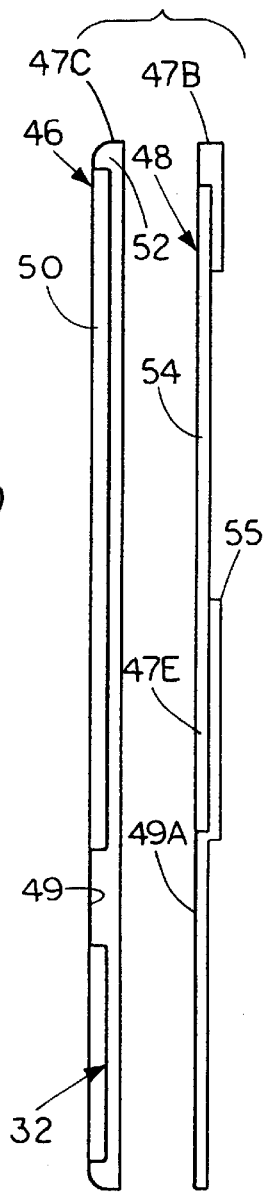

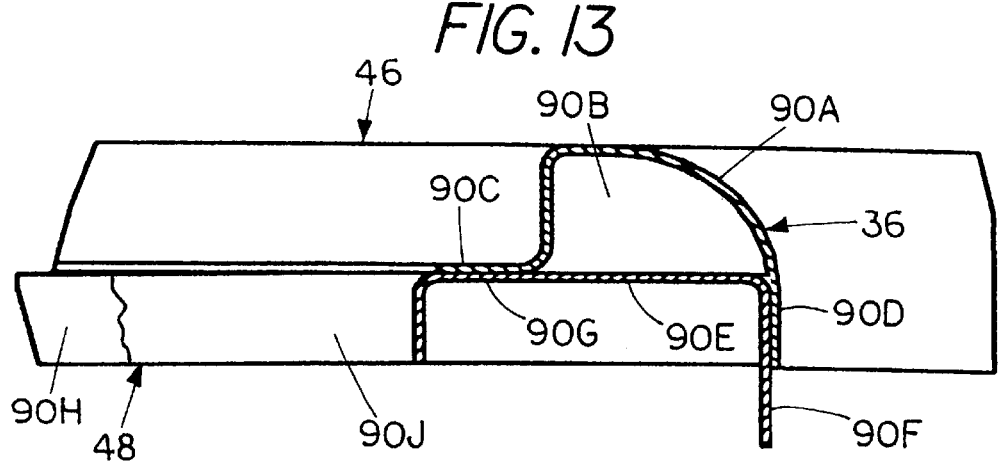
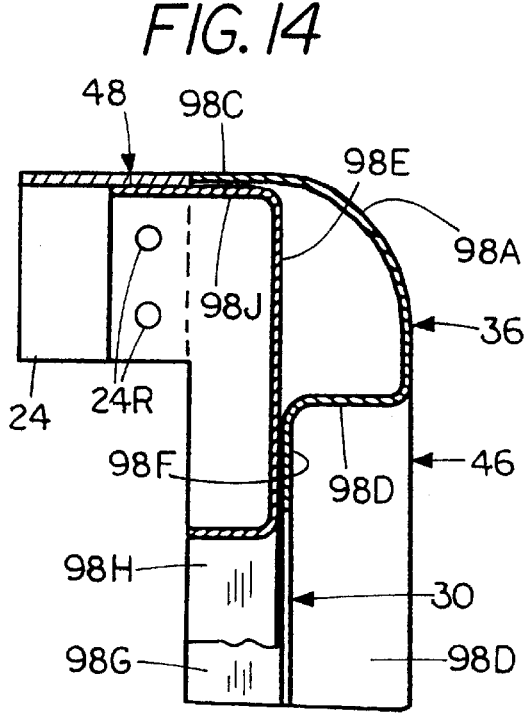
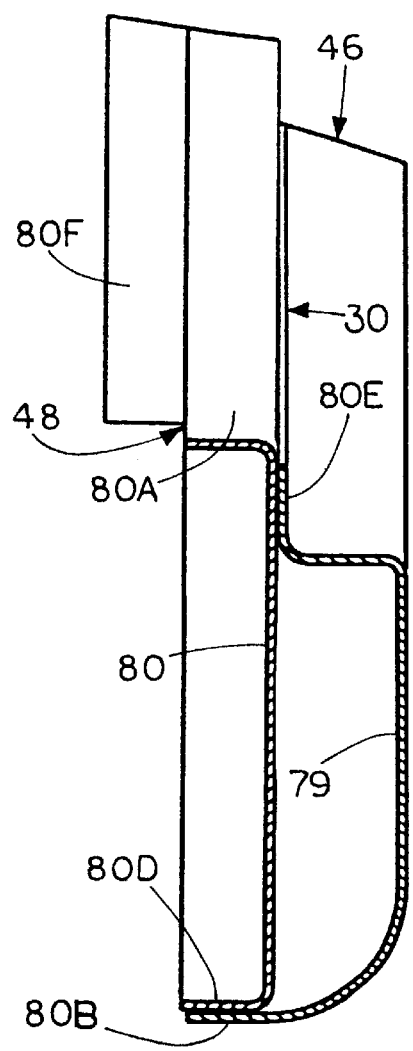

SIDE PANEL ASSEMBLY FOR WHEELED WORK MACHINE

CROSS REFERENCE TO RELATED APPLICATION

Reference is made to U.S. patent application Ser. No. 09/977,092, filed Oct. 12, 2001, for Wheeled Work Machine with Frame, which is incorporated by reference.

BACKGROUND OF THE INVENTION

The present invention relates to a work machine construction, and more particularly to an easily formed cab and rigid side panels for the cab of a wheeled work machine. The side panels are an assembly of two nesting, die formed panels that are rigidly joined together to provide a smoothly curved shape, in a rigid assembly for structural integrity without having a number of individual pieces welded together.

In the manufacture of vehicle cab panels, it has been the common practice to have several individual pieces that are welded together to provide sufficient structural integrity to carry loads on the roof, as well as side loads on the side panels, without denting or bending easily. The prior assembly procedures generally involve the need for welds that have to be smoothed or ground to present a smooth finish for painting. Individual reinforcing members were welded to the sheet metal assemblies for strength. Smooth uniformly appearing exterior surfaces were difficult to obtain.

SUMMARY OF THE INVENTION

The present invention relates to a cab and side panels for the cab of a wheeled work vehicle that has side operator access openings, and observation panel openings formed in the side panels. The operator access openings can have doors installed if desired. The cab and side panels are quickly assembled with cross panel assemblies between the side panels and are free of surface welds that require extensive grinding or finishing for painting.

A side wall panel of a cab made according to the present invention has two die formed sheet metal panel sections that are provided with the necessary cut-outs for doors and observation openings, and which are curved or contoured to provide a pleasing shape for the cab. The side panel assemblies are made to have rounded edges and include channel-shaped recesses on one formed panel section which mate with or are covered by facing walls of a second panel section so that when the two panel sections are rigidly joined together, for example by welding and preferably spot welding in most places to avoid weld beads, they form rigid box sections that provide rigidity and strength with relatively easily die formed panel assemblies.

BRIEF DESCRIPTION OF THE DRAWINGS

FIG. 3 is a side view of a cab side panel assembly made according to the present invention;

FIG. 4 is a exploded sectional view of FIG. 3 of the side panel assembly of the present invention taken on lines 4—4 in FIG. 3, showing the two individual die formed side panel sections separated prior to assembly;

FIG. 13 is an enlarged, fragmentary sectional view taken on line 13—13 in FIG. 2;

FIG. 14 is an enlarged, fragmentary sectional view taken on line 14—14 in FIG. 3; and FIG. 15 is an enlarged, fragmentary sectional view taken on line 15—15 in FIG. 3.

DETAILED DESCRIPTION OF THE PREFERRED EMBODIMENTS

Figure 1:
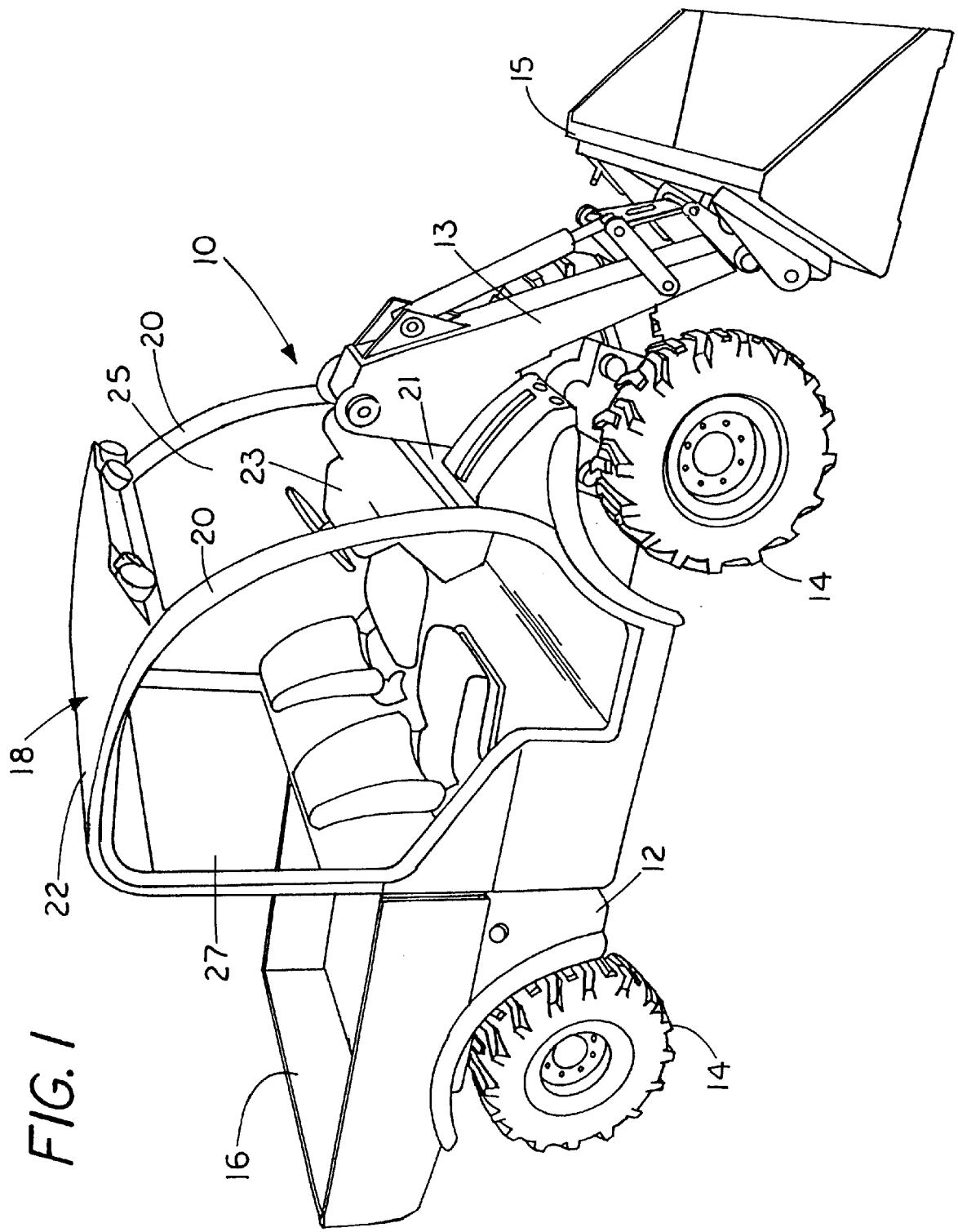
FIG. 1 is a schematic representation of a wheeled work machine having a cab structure using the side panel assemblies made according to the present invention.
Figure 2:
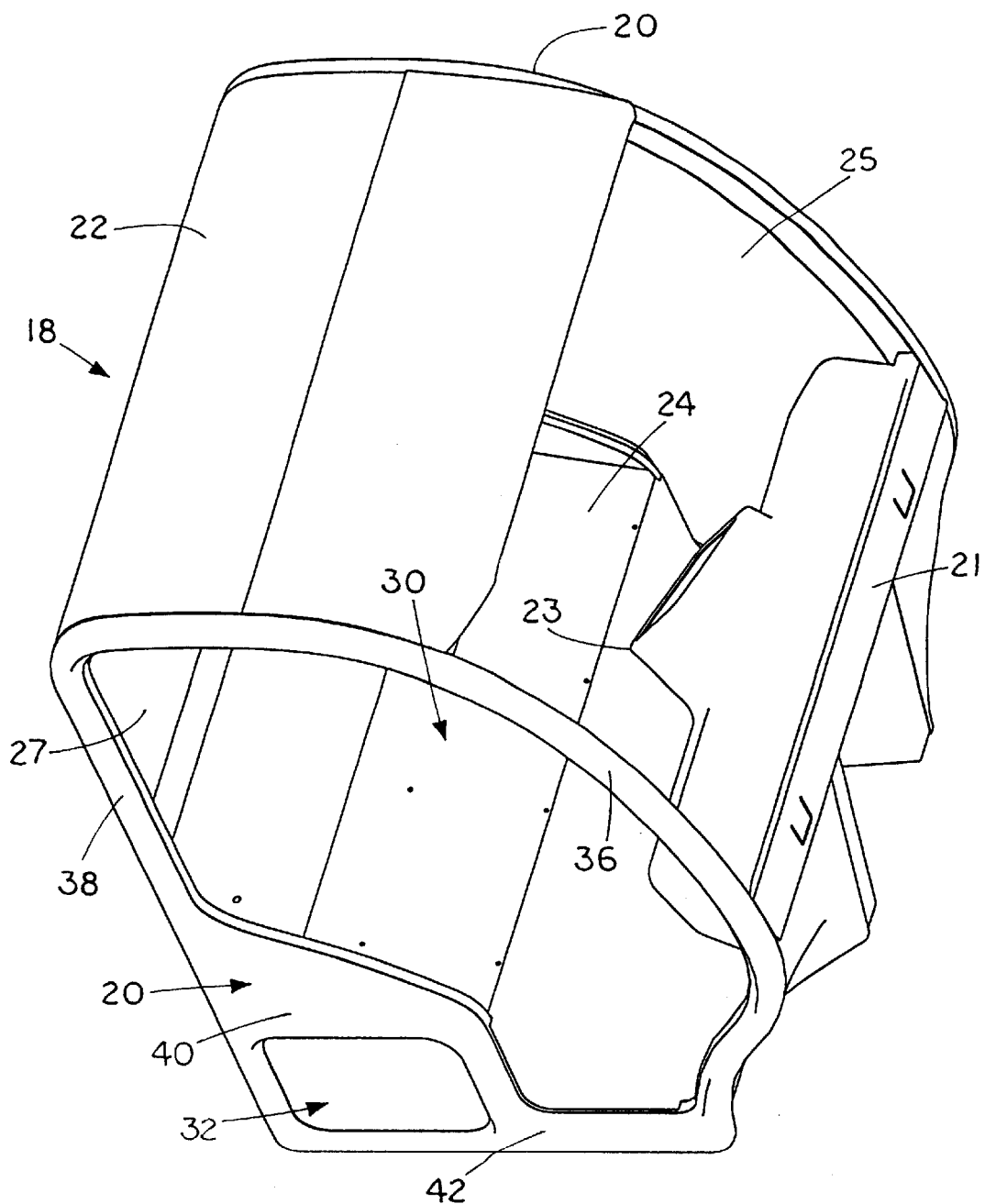
FIG. 2 is a perspective view of a cab for the work vehicle of FIG. 1.

In FIG. 1, a wheeled work machine indicated generally at 10, includes a frame 12, that mounts wheels 14 can be powered in a suitable manner and which has a boom 13 on which various work attachments such as a bucket 15 can be mounted. At least the front wheels 14 are steerable, to maneuver the machine, and a storage box 16 can be provided for the back. An operator's cab 18 is shown, and the operator's cab is made up on individual formed panels, including side wall panel assemblies 20, for the right and left side which are mirror images of each other. Structural cross-panels such as a roof panel 22, and a seat support panel 24 extend between the side panel assemblies. A front panel 21 is provided between the side panel assemblies 20 and is used for mounting an instrument cluster 23 and providing a support steering column. Other cross panels for joining the two side frame panel assemblies 20 together may be used. A front window opening 25 is also provided, as is a rear window opening 27.

The side panel assemblies 20 require strength in vertical direction, as well as in fore and aft direction. Additionally, the side panel assemblies 20 have smoothly curved or contoured portions that are formed to provide a pleasing appearance and also access and observation openings as desired in the side panel assemblies, both for operator access, and access to components that are positioned under the seat panels.

FIG. 3 is a side view of the right side panel assembly, as shown, the left side panel assembly is identical in construction, but is a mirror image of the right side panel assembly. As can be seen, the panel assembly 20 has an operator access opening 30 which is quite large, so that an operator can enter the cab 18, and has a further access or observation opening 32 that is smaller and which would fit under the seat support panel 24. The opening 32 is normally covered with a hinged cover.

The operator access opening 30 is defined by a front curved, post-like section 36, which is integral with a rear upright post 38, and lower wide panels 40, which shield components, such as an engine, that are accessible through the access opening 32.

The front post 36 and rear posts 38 are formed to be about the same cross sectional size. The bottom portion 42 below the operator access opening 30 as well as the panels 40 are of different cross sectional size.

FIG. 4 shows that the panel assemblies 20 are made up of two nesting panel sections that are die formed. An outer panel section 46 has an inner panel section 48 nested therein, to form the panel assembly 20, and mating surfaces of the two sections are preferably spot welded or otherwise rigidly joined together to make the assembly. There are no arc welds on the outer surface of the panel assembly. FIG. 4 shows the two panel sections 46 and 48 separated, and as will be shown in enlarged, separately numbered sectional views, the outer panel 46 has formed recesses shown generally at 60 and 62 in FIG. 5 that are closed by walls generally indicated at 54 on the inner panel to form box sections when the side panel sections 46 and 48 are spot welded together. Spot welding of overlapping flanges for forming parts together is described and preferred in most locations because spot welds are less visible than many fasteners. The panels can be joined by adhesives, such as epoxies, rivets, resistive welding, MIG welding or with other desired fasteners. Spot welding is preferred and is used in the description, without limitation.

Figure 5:
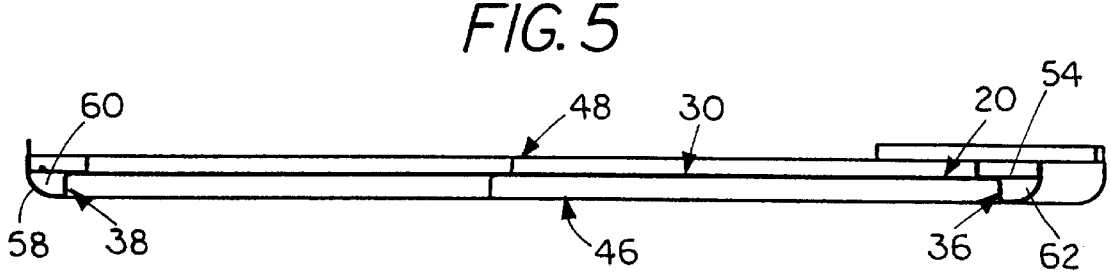
FIG. 5 is a sectional view taken on line 5—5 in FIG. 3.

Referring to FIG. 5, a cross section showing the two side panel sections 46 and 48 in assembly to form the side panel assembly 20 is illustrated. This cross section is taken on line 5—5 in FIG. 3, and shows the rear post 38 and the front post 36 in assembly. It can be seen that the inner panel surface or wall 54 mates against the outer panel 46, and in areas such as the rear post 38, the inner wall 54 spans the recessed channels 60 of the outer panel to form a box sections. At the front post, the wall 54 spans a portion of a recessed channel portion 62 to form a box structural section. The outer wall of the outer panel is rounded as shown at 58 along the rear post and as shown at 70 along the front post.

Figure 6:
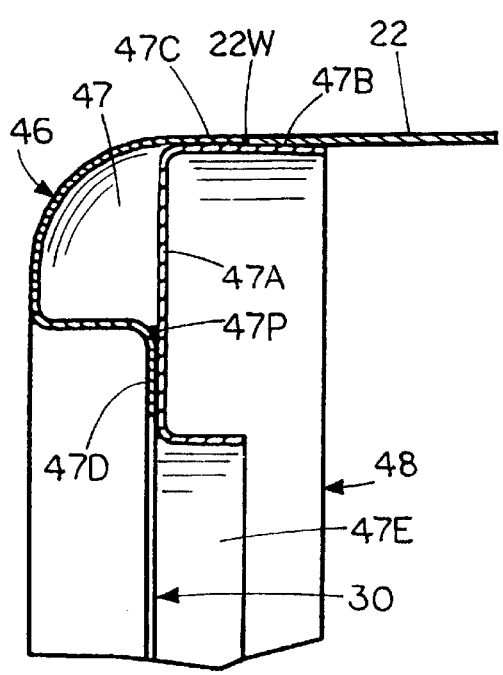
FIG. 6 is a further fragmentary enlarged sectional view taken on line 6—6, in FIG. 3.

FIG. 6 is an enlarged view and shows details that are separately numbered. The outer panel section 46 has a curved receded section 47 at the corner or outer edge of post 36, and the inner panel has a wall 47A that spans that recess 47 and a formed flange 47B mates with a flange 47C on the outer panel section 46 for ease of joining by spot welding. The wall 47A extends to engage a flange 47D that extends around the operator access opening 30. The panel sections 46 and 48 are joined together illustratively with an adhesive 47P, such as an epoxy, or they can be spot welded also. The flange 47B of inner panel section 48 extends inwardly beyond the flange 47C to provide a surface on which roof panel 22 is welded and this weld may be a continuously welded joint 22W. The inner panel 48 also has an in-turned flange 47E that extends for a selected distance around the operator access opening 30.

Figure 7:
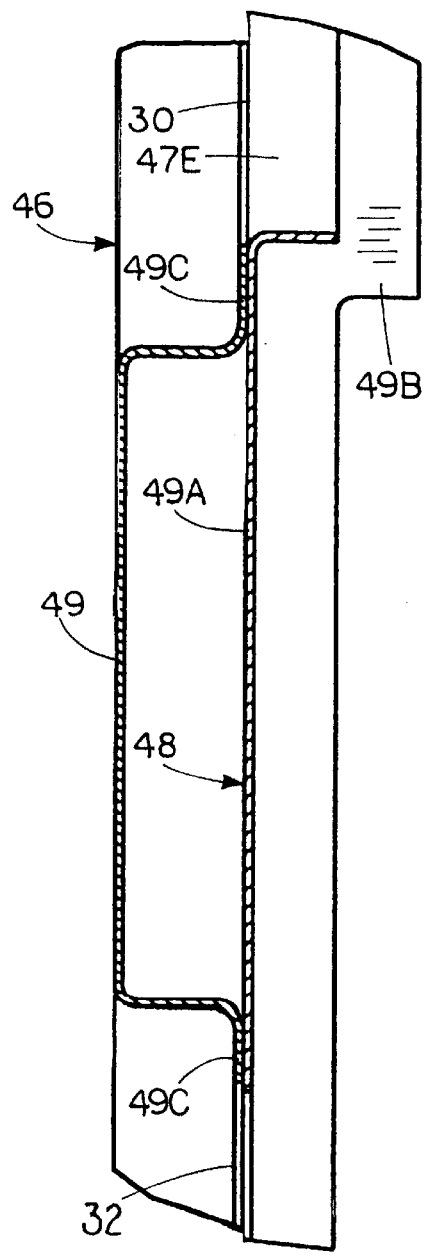
FIG. 7 is an enlarged fragmentary sectional view taken on line 7—7 in FIG. 3, showing details of mating portions of the individual side panel section.

FIG. 7 shows that the lower part of the side panel section 46 has a larger size recess 49, and a wall section 49A of inner panel section 48 overlies and spans the recess. The flange 47E continues down to this section, as shown. A flange section 49B extends inwardly for supporting the seat cross panel 24. The side panel sections 46 and 48 are spot welded together or otherwise joined at flange section 49C that surrounds access opening 32. A door or cover can be supported on flange 49C.

Figure 8:
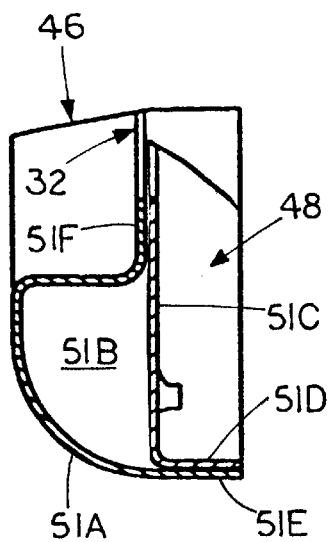
FIG. 8 is an enlarged fragmentary sectional view taken on line 8—8 in FIG. 3.

FIG. 8 is a detail of the lower rail section at the bottom of the access opening 32. The outer panel section 46 has a rounded corner 51A that forms a channel recess 51B facing toward the inner panel section 48. The inner panel section 48 has a wall 51C that overlies and spans the channel 51B and also has a flange 51D that overlies a flange 51E on the outer panel section 46. The wall portion 51C extends up to the access opening 32 and the upper portion rests on flange 51F when the inner and outer panel sections 46 and 48 are assembled. The flange 51D and 51E and the flange 51E and the upper part of wall 51 are easily spot welded together when the inner side panel section 48 is nested in the outer side panel section 46.

Figure 9:
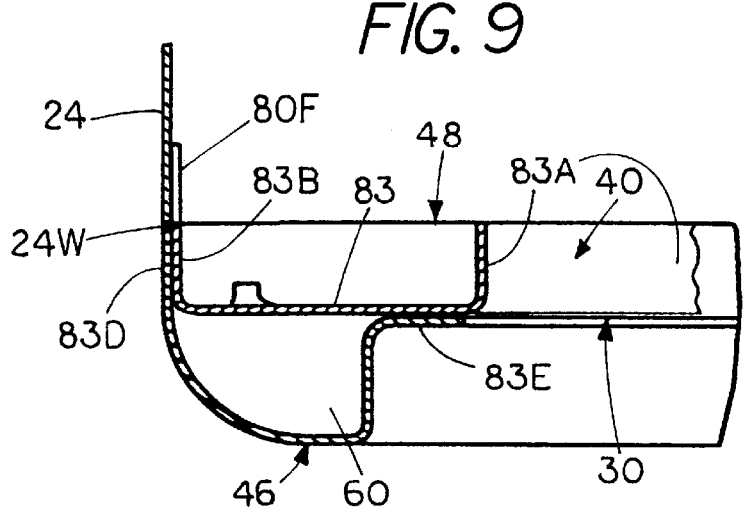
FIG. 9 is an enlarged, sectional view taken on line 9—9 in FIG. 2.

FIG. 9 illustrates the rear post 38 where the outer panel section 46 has channel 60 shown and the inner panel section has a wall portion 83 that is formed to close the channel 60 and form a box section with the channel 60. Also the inner panel section 48 also has a flange wall 83A around the operator access opening 30. The outer panel 46 section also has a flange 83E joined to the inner section 48. The flange 83A provides a door frame around the operator access opening 30. An edge flange 83B mates with a flange 83D on the outer panel section 46 and is joined, preferably by spot welding to the flange 83D. A flange 83F extends inwardly beyond flange 83B. Cross panels or members such as seat panel 24 are welded to the flange 83F preferably by a continuous weld 24W along the end of panel 24. The flange 83F is a portion of flange 49B in FIG. 7.

Figure 10:
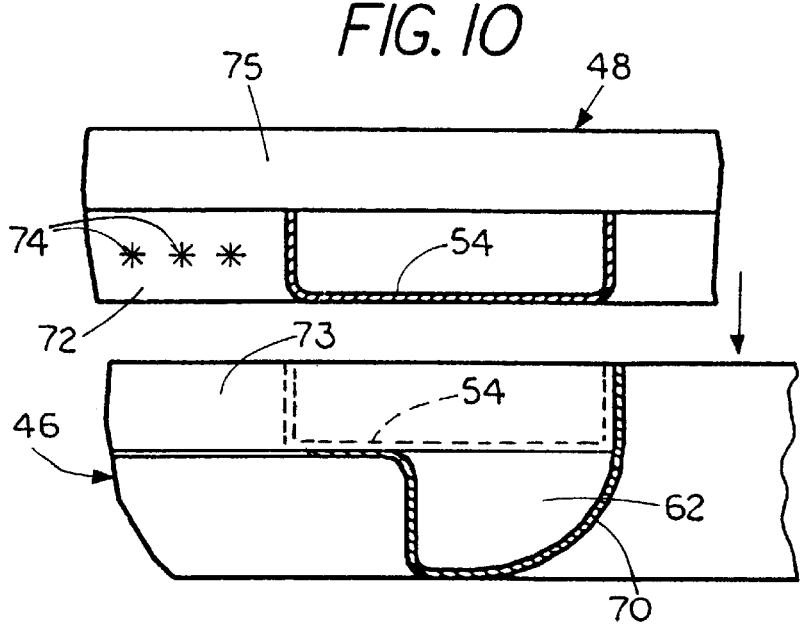
FIG. 10 is an enlarged, fragmentary sectional view taken on line 10—10 in FIG. 3, showing the two panel sections separated before assembly.

FIG. 10 shows that the front inner panel section 48 has a wall 54 spanning a channel space 62 in the outer panel section 46 to form a box section post with the rounded portion 70 of the outer panel 46. The panel sections have flanges at desired locations 72 and 73 that mate and overlie each other and as shown they are spot welded in selected places 74 to cause the two panels to be completely rigidified, forming strong box sections around the formed portion of the frame. In other words, the die formed openings 62 (and 60) as shown in FIG. 5, continue around the entire operator access opening 30. The recesses become box sections because of the rigid joining together of the inner and outer panel sections 46 and 48. The inner panel section 48 also has a flange 75 extending inwardly at an exterior width at a little lower level than the section line 10—10, for attaching of the cross member or dash board 21 and instrument cluster 23.

Figure 11:
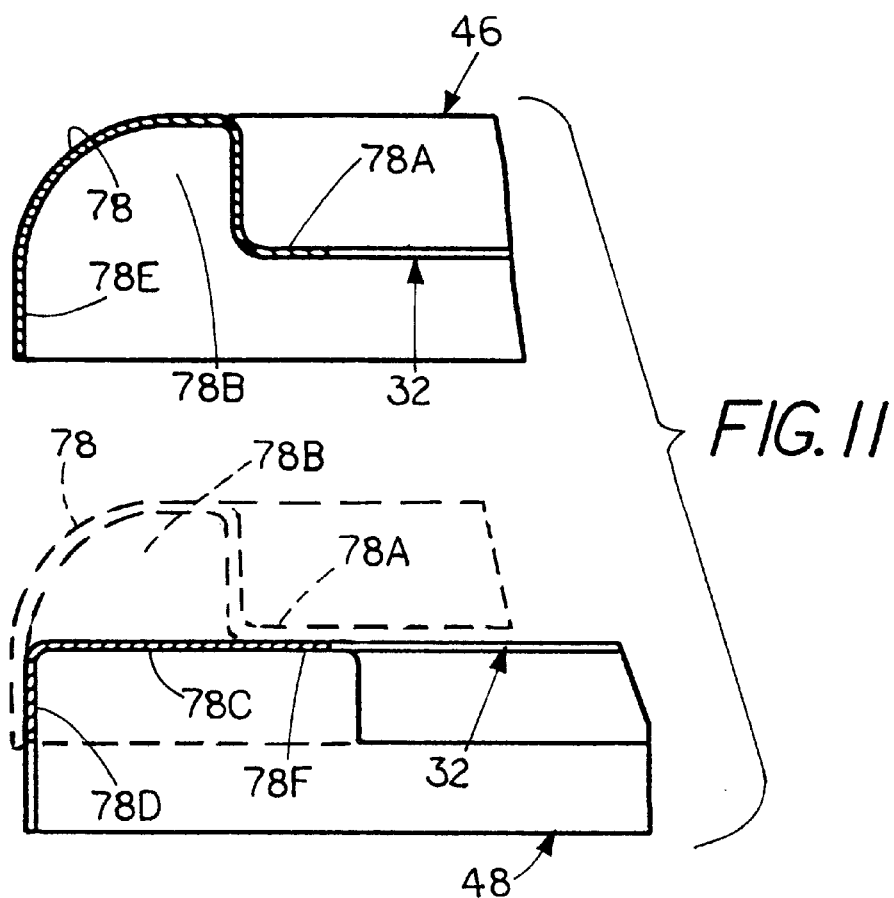
FIG. 11 is an enlarged, fragmentary exploded sectional view taken on line 11—11 in FIG. 3, with an outer panel section shown in assembled position in dotted lines.

FIG. 11 is a cross sectional view of a perimeter post adjacent to the access opening 32, and is an exploded view. The outer panel section 46 and inner panel section 48 are shown in fragmentary enlarged detail. The outer panel section 46 has a curved outer surface shown at 78, that is shaped the same way as the posts shown in FIGS. 6, 8, 9 and 10, and as can be seen a flange section 78A is formed around opening 32. The curved portion 78 forms a recess 78B, and the inner panel section 48 has a wall 78C that closes in the channel shaped space or opening 78B. The inner panel 48 also has a flange 78D that mates with a flange portion 78E. When the flange 78A is joined to the edge flange 78F of wall 78C and flanges 78D and 78E are spot welded together the post is a rigid, strong, torsion resisting box section. The wall portion 78F is spot welded or otherwise joined to flange 78A all around the perimeter of the opening 32.

Figure 12:
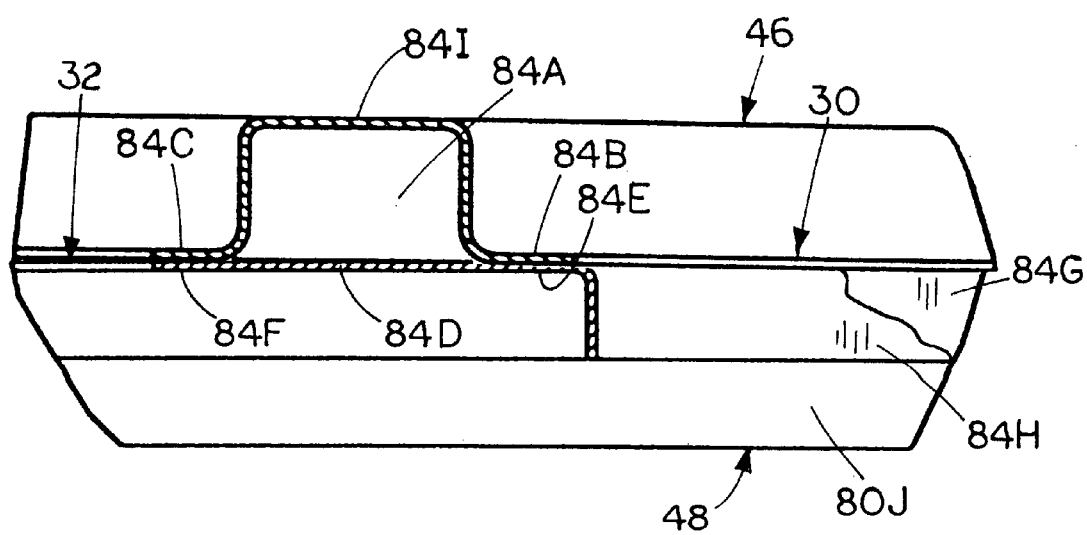
FIG. 12 is an enlarged, fragmentary sectional view taken on line 12—12 in FIG. 3.

FIG. 12 is a sectional view looking upward, as is FIG. 11, but on the opposite side of the access opening 32, adjacent to the operator access opening 30. In this view, the inner side panel section 48 has a wall portion 84D that overlies a recess 84A in panel section 46, formed as a rectangular post 84, and is spot welded at a wall portion 84E to a flange 84B, and at a wall portion 84F to flange 84C. The outer wall panel section 46 has the flange 84G that mates with a flange portion 84H on the inner panel section 48. The inner panel section 48 also has a further flange 84J that extends inwardly and can be used for fastening in the seat cross panel 24 or other items.

FIG. 13 is a cross section taken along the line 13—13 looking upwardly on the front post 36. The outer panel section 46 has a curved post portion surface 90A, forming a recess 90B (also shown at 62 in FIG. 5) that has a flange 90C along one side of the operator access opening 30. It also has an inwardly extending forward front flange 90D. The inner panel section 48 has a wall section 90E that closes off or spans the recess 90B, and has a flange 90F that mates with the flange 90D and as shown is spot welded thereto, and also has a wall portion 90G that mates with the flange 90C and is also shown as being spot welded thereto. The flange 90H which is a continuation of flange 90D, is joined to flange 90J to rigidify the frame.

The side panel assembly 20 extends forwardly from the line of FIG. 13, and mates with the section shown in FIG. 10, which has separate numbers for the flanges and recesses.

FIG. 14 is a cross sectional view taken on line 14—14 to show, again, the finishing detail of the forward post 20 where it curves across the top of the operator access opening 30. The outer panel section 46 has a curved wall portion shown at 98A, forming a recess 98B, and a flange 98C around the perimeter. Also the offset wall 98D extends around the post, as shown, the inner side panel section 48 has a wall portion 98E that overlies the recess 98B, and is rigidly joined to a flange 98F, and the flange 98J is rigidly joined to the flange 98C.

The inner panel 48 has a flange 98H that mates with a flange 98G on the outer wall panel section 46 and is preferably spot welded thereto as well, or, as stated, the flanges can be held together with adhesive. Also, as illustrated as a modification, the roof panel 24 can be riveted with rivets 24R to the outer portion of flange 98J in selected locations, in place of the continuous weld. The other parts that are welded can be riveted as well.

It can thus be seen that the side panel assembly 20 can form a very rigid side panel structure for use for the cab 18.

In selected areas the inner panel section 48 is provided with an extra width, inwardly extending flange section or portion to provide an area for welding or otherwise joining cross panels to the inner panel section 48.

FIG. 15 illustrates a portion where the outer panel section 46 has an outer lower channel region shown at 79, and when the inner panel section 48 is nested, a wall portion 80 is formed to close the channel 79 and form a box section with the channel 79. The inner panel section 48 also has a flange wall 80A around the operator access opening 30. The outer panel section 46 also has a flange 80E rigidly joined to the inner panel section 48. This provides a door frame around the operator access opening 30. An edge flange 80B mates with a flange 80D on the inner panel section and is fixed or joined to the flange 80D. A flange 80F extends inwardly beyond flange 80A. The ends of cross members or panels, such as a dashboard, are continuously welded to the flange 80F.

Thus, each side panel assembly 20 is made up of two die formed complete side panel sections that encompass operator access openings as well as equipment access and observation openings, and which are formed from single sheets of metal. The outer panel section 46 of the panel assembly 20 is formed with generally channel shaped recesses facing or opening inwardly and having an outer wall and inwardly side extending walls. The inner edges of the recesses of the outer panel section rest against walls of the inner panel section. The inner panel section has planar walls that span the recesses in the outer panel section and then the panel sections are spot welded together in selected locations to form box sections in the panel assembly that essentially surround the operator and other openings. This assembly provides rigid posts that can be formed with contours and curves because of the die forming of the individual inner and outer panel sections. The inner panel section further includes flanges in selected locations that extend inwardly beyond the flanges that are formed on the outer panel section to thereby provide backing walls or surfaces for attaching cross-panels to form a complete cab.

Although the present invention has been described with reference to preferred embodiments, workers skilled in the art will recognize that changes may be made in form and detail without departing from the spirit and scope of the invention.

What is claimed is:

1. A cab side panel assembly for a vehicle having an operator access opening, said panel assembly being formed as a single unitary piece having narrow posts defining forward and upper portions of the operator opening, the panel assembly comprising inner and outer die formed panels each die formed panel being formed from a single sheet of material, the outer panel having an outer surface and a rounded peripheral edge with peripheral flange portions generally perpendicular to a plane of the outer surface, the outer surface including outwardly extending wall sections forming recesses open to an inner side thereof, and the inner panel having a planar surface mating against inner surface portions of the outer panel and nesting inside the peripheral flange portions of the outer panel and having wall portions that span the recesses of the outer panel, and the inner panel having a inner peripheral flange resting against the peripheral flange portions of the outer panel, the inner and outer panels being rigidly joined together at the peripheral flange portions to form a side wall panel assembly that has box section forms at the recesses, the recesses surrounding the major portions of the operator access opening and the inner and outer panels having no portions extending outwardly from the perpendicular flange portions of the outer panel.

2. The panel assembly of claim 1 wherein there is a separate access opening in the panel assembly, the separate access opening being formed in the inner and outer panels, and the separate access opening being surrounded by box cross sections when the inner and outer panels are joined together.

3. A side panel assembly forming a portion of a cab for a vehicle comprising two unitary single sheet die formed panel sections having an operator access opening and wherein the die formed panel sections include an outer panel section that has recesses in a wall and a rounded outer peripheral edge flange formed outwardly from an outer surface of the outer panel section and rounded inwardly to be formed perpendicular to the outer surface into a perpendicular flange portion, the outer panel being rounded to extend inwardly around the operator access opening, and the recesses in the outer panel section, including the rounded outer peripheral edge, being spanned by wall portions of an inner panel section that are secured to the outer panel adjacent the recesses, to form rigid box sections around the operator's access opening and the rounded peripheral edge, the inner panel section having a shape to nest entirely within the perpendicular peripheral flange portion of the outer panel and within edges of the operator's access opening of the outer panel, and the panel sections being rigidly joined together to form a rigid cab side panel assembly with no portion of the inner panel section extending outwardly from the perpendicular peripheral flange portion of the outer panel section.

4. The side panel assembly of claim 3, wherein the side panel sections have curved posts formed from a lower portion of the side panel assembly along a forward side and extending rearwardly toward a roof panel.

5. The side panel assembly of claim 4, wherein the curved posts define the operator access opening.

6. The side panel assembly of claim 3, wherein the inner panel section has perpendicular panel peripheral flange portion that are overlapped by the perpendicular peripheral flange portions of the outer panel section, and the overlapping flanges on the inner and outer panel being rigidly joined together.

7. The side panel assembly of claim 6, wherein the inner panel section peripheral flange has inwardly extending flange portions that extend perpendicular to the outer surface of the inner panel section beyond the perpendicular peripheral flange portion of the outer panel section for supporting cross panels forming a portion of a cab for a vehicle.

8. The cab assembly for a vehicle comprising a pair of side panel assemblies each comprising a pair of nested die formed panels with an inner panel fitting into a first lateral, inwardly extending flanges of an outer panel, the inner panel having an outer surface with inwardly extending second flanges that extend inwardly beyond the first flanges along upper portions of a periphery of the side panel assemblies and along mid portions of the side panel assemblies, a roof cross panel secured to the inwardly extending second flanges at the upper portions of both of the side panel assemblies and at least a seat support cross panel secured to the inwardly extending second flanges in the mid portions of both of the side panel assemblies.

9. The cab assembly of claim 8, wherein the side panel assemblies have inwardly extending flanges at forward sides thereof at the periphery, and a front cross panel secured to the inwardly extending flanges at the forward sides of both of the side panel assemblies.

10. The cab assembly of claim 10, wherein the cross panels are welded to the respective inwardly extending flanges.

11. The cab assembly of claim 8, wherein the inner panel is entirely within a periphery of the outer panel, the outer panel having channel shaped portions formed therein, around peripheral edge portions of the outer panel, the channel shaped portion having an open side facing the inner panel, the inner panel having a wall spanning the channel shaped portion open side and fixed to the outer panel to form box cross section peripheral edge portions when the inner and outer panels are fixed to each other.

12. The cab assembly of claim 11, wherein the inner and outer panels sections are fixed to overlapping wall portions of each other by one of a group consisting of spot welding, continuous welding, riveting and adhesively fixing the overlapping wall portions.

13. The cab assembly of claim 11, wherein the outer panel has planar flange walls extending from opposite edges of the open side of the channel shape portion, the wall of the inner panel contacting and being welded to the flange walls of the outer panel.

* * * * *